United States Patent
Monia et al.

[11] Patent Number: 5,987,558
[45] Date of Patent: Nov. 16, 1999

[54] METHOD AND APPARATUS FOR RESOLVING OVER LAPPING SELECTION AND RESELECTION OPERATIONS OF SCSI BUS PROTOCOLS

[75] Inventors: Charles Monia, Marlboro; Fee Lee, Framingham; William Ham, Andover, all of Mass.

[73] Assignee: Digital Equipment Corporation, Houston, Tex.

[21] Appl. No.: 08/965,072

[22] Filed: Nov. 5, 1997

[51] Int. Cl.[6] ................................................ G06F 13/14
[52] U.S. Cl. .................. 710/240; 710/128; 710/120; 710/112; 710/113
[58] Field of Search .................. 395/290–299, 395/728–732; 710/128

[56] References Cited

U.S. PATENT DOCUMENTS

| | | | |
|---|---|---|---|
| 5,274,783 | 12/1993 | House et al. ............................. | 395/309 |
| 5,414,818 | 5/1995 | Henson et al. .......................... | 395/299 |
| 5,524,236 | 6/1996 | Ostrowski ............................... | 395/500 |
| 5,528,765 | 6/1996 | Milligan ................................. | 395/287 |
| 5,621,899 | 4/1997 | Gafford et al. ......................... | 395/299 |
| 5,708,784 | 1/1998 | Yanai et al. ............................ | 395/299 |
| 5,717,873 | 2/1998 | Rabe et al. ............................. | 395/290 |
| 5,778,235 | 7/1998 | Robertson ............................... | 395/728 |

*Primary Examiner*—Ayaz R. Sheikh
*Assistant Examiner*—Raymond N Phan
*Attorney, Agent, or Firm*—Christine M. Kuta; William J. Kubida; Holland & Hart LLP

[57] ABSTRACT

A SCSI bus extender apparatus coupling a primary SCSI bus to a secondary SCSI bus includes a mechanism for detecting and resolving contention between a substantially simultaneous SELECTION operation on the primary bus and a RESELECTION operation on the secondary bus. The inventive method contemplates the bus extender arbitrating for control of the primary bus after a conflict is detected, and releasing control of the secondary bus if control of the primary bus is obtained. A target device on the secondary bus can then rearbitrate for control of the secondary bus. Once the target device controls the secondary bus, it can direct a RESELECTION signal to the bus extender, which responsively directs the signal to an initiator device on the primary bus. If the bus extender is unable to gain control of the primary bus after a conflict is detected, the SELECTION operation is allowed to proceed and the target device reattempts to assert the RESELECTION operation thereafter.

12 Claims, 4 Drawing Sheets

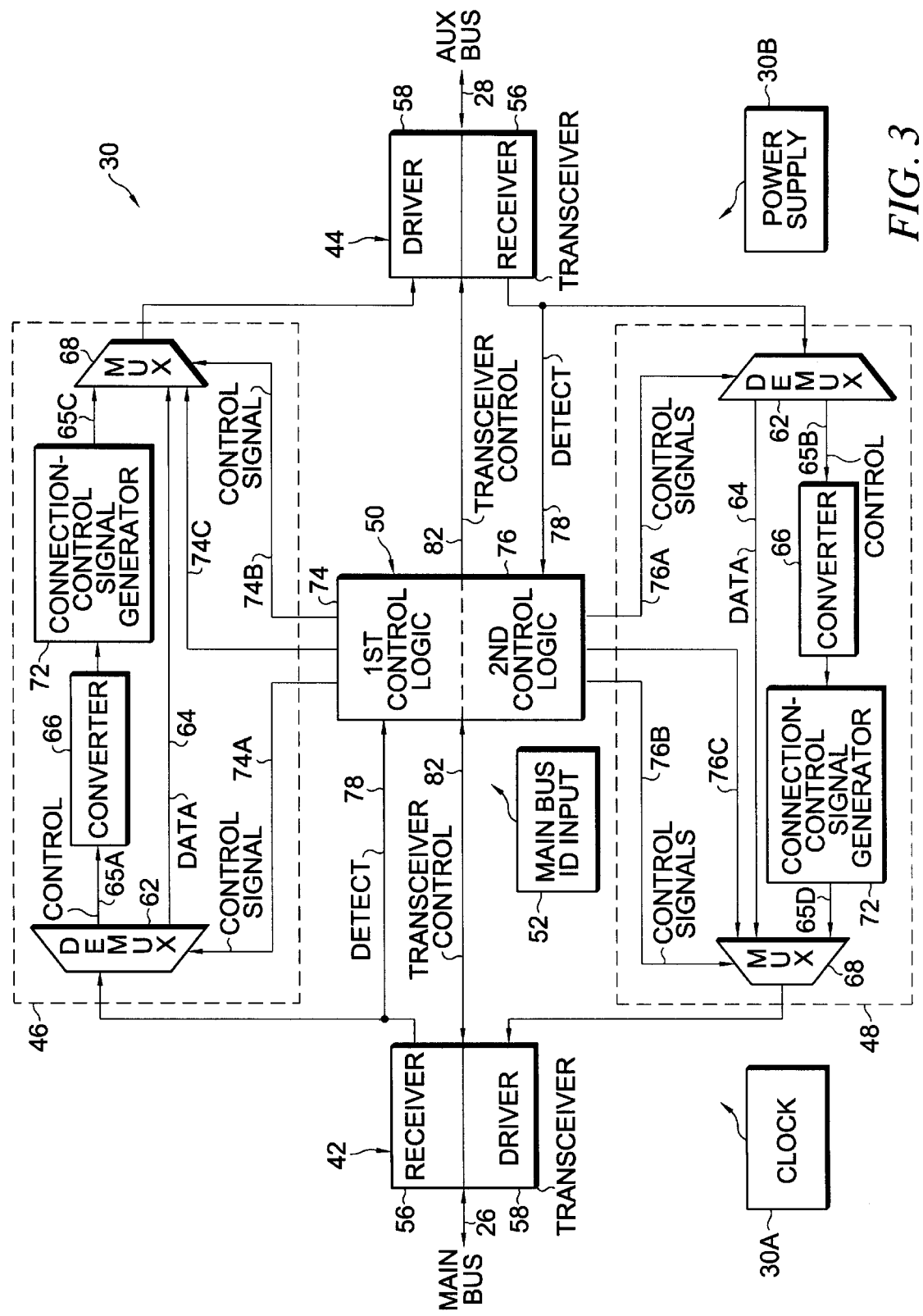

METHOD AND APPARATUS FOR RESOLVING OVER LAPPING SELECTION AND RESELECTION OPERATIONS OF SCSI BUS PROTOCOLS

FIELD OF THE INVENTION

The invention generally relates to computer systems, and, more particularly, to input/output interfaces used to connect peripheral devices to a digital computer.

COPENDING APPLICATIONS

This application is the one of two patent applications filed on an even date herewith and commonly assigned, including U.S. patent application Ser. No. 08/965,073, entitled "SCSI Bus Extender Utilizing Tagged Queuing in a Multi-Initiator Environment." The subject matter of the above-identified copending patent application is incorporated herein by reference.

BACKGROUND OF THE INVENTION

The well recognized Small Computer System Interface ("SCSI") standards of the American National Standards Institute (ANSI X3.131-1986) specify the electrical, mechanical and logical characteristics of an input/output (I/O) bus interface for coupling physically small computers with other small computers and peripheral devices. Such peripheral devices may include, for example, disk drives, tape drives, printers, compact disk read-only memories, and scanners. The SCSI standards are available from the American National Standards Institute, Inc., New York, N.Y., U.S.A., and are incorporated herein by reference.

The SCSI standards generally specify an I/O bus, which commonly is referred to as a "SCSI bus." Instead of requiring a separate bus controller, a SCSI bus utilizes a SCSI bus protocol, specified by the SCSI standards, that is implemented distributively within either central processing units, host adapters of computers on the bus, and/or controllers of peripheral devices on the bus.

The SCSI bus protocol facilitates information transfer between devices connected to the bus. More particularly, the bus protocol includes an addressing mechanism for identifying the devices on the bus, and specifies connection-control signals for transferring data between an initiating device i.e., "initiator" and an intended recipient device i.e., "target". The connection-control signals first arbitrate for control of the SCSI bus, and then establish a connection between an initiator and a target when the initiator controls the SCSI bus. A process designated by the standard as SELECTION occurs when an initiator (typically a host computer) establishes a connection by a signaling a device that is to become a target. Conversely, a process designated by the standard as RESELECTION occurs when a target notifies an initiator that an existing connection is to be reestablished for the purpose of continuing a transfer.

In general, any peripheral device having a controller complying with the SCSI standards can function properly when connected to a SCSI bus. Accordingly, the standards have lead to a proliferation of the types and sources of commercially-available peripheral devices that may be used with conventional computer systems complying with the SCSI standards. Moreover, computer systems complying with the standards can easily be configured and reconfigured by end users to meet specific computing needs, and to incorporate evolving peripheral device technologies.

While many conventionally implemented SCSI bus interfaces are suitable for their intended purposes, most generally are limited to supporting no more than fifteen peripheral devices. This limit presents a significant drawback in the art. Furthermore, as systems employing SCSI buses have expanded and become more powerful, the need has increased for more storage capacity and the ability to connect more peripheral devices to the bus. For instance, the need for more storage often is particularly acute in multi-user computer systems.

A known approach for increasing the number of SCSI peripheral devices that may be connectable to a SCSI bus is disclosed in U.S. Pat. No. 5,274,783, House et al., assigned to Digital Equipment Corp. of Maynard, Mass., the subject matter of which is incorporated herein, in its entirety, by reference. House et al. discloses a bus extender for connecting a secondary SCSI bus to a single port on a main SCSI bus. In this manner, one or more host computers on the primary bus can be interconnected to one or more peripheral devices on the secondary bus. Since the bus extender interface complies with SCSI standards, any of a variety of types of commercially-available peripheral devices having SCSI controllers can be supported on the secondary bus.

The bus extender employs a first transceiver coupled to the main SCSI bus, a second transceiver coupled to the secondary bus, and signal transfer and logic circuitry for controlling the operation of the transceivers and passing signals between the transceivers. The logic circuitry also performs the address translation necessary for inter-bus communication.

The bus extender disclosed in House et al. takes advantage of the dual-tier, hierarchal addressing system, specified by the SCSI standards, to direct messages from initiators on the main bus to targets on the secondary bus. In the addressing mechanism employed by the House device, each device connected to either the main or secondary bus is identified by a unique device identification code ("ID"). In addition, each device on the secondary bus is associated with an auxiliary identification, which in the SCSI standards is referred to as the logical unit number (LUN).

For purposes of communication, the bus extender has an ID on both the main and secondary buses. Whenever connection-control signals on either the main or secondary buses reference the ID of the extender, the extender responds and attempts to establish the connection necessary to transfer information to the ultimate recipient on the specified bus.

During a SELECTION, the extender first converts the LUN field data of the connection-control signals received over the primary bus to the ID of the target on the secondary bus, and then supplies its auxiliary-bus ID as the initiator ID in the auxiliary-bus connection control signals. The extender then attempts to establish a communication link with the target device via connection-control signals on the secondary bus by using the target ID generated by the extender. Analogously, during a RESELECTION, the extender converts the target ID contained in the auxiliary-bus connection-control signals into LUN field data, supplies the extender's own main-bus ID as the target attempting RESELECT, and then uses the ID of the initiator of the earlier SELECTION, which the extender has stored (e.g., in a suitable latch), for directing the RESELECTION message to the initiator.

Once a communication link for SELECTION or RESELECTION has been established between the initiator and the target, the extender transfers message data signals e.g., COMMAND, STATUS, DATA-IN, and DATA-OUT between the main and secondary buses directly and without modification. The extender therefore intervenes only when the communication link is being established and not when the actual information is transferred.

Problems arise with the House bus extender, however, when there is a simultaneous SELECTION and RESELECTION by an initiator on the main bus and target on the secondary bus. Such situation is referred to as a SELECTION and RESELECTION conflict. As described at column 12, lines 13–21 of House et al., the bus extender attempts to resolve such conflict by causing an unexpected bus free state on the primary bus. According to the SCSI standards, an initiator that detects an unexpected bus free condition at this point should assume that the target wishes to perform a RESELECTION. In practice, however, many initiator implementations, behave unpredictably and often treat this condition as a fatal error. Accordingly, a need exists for an improved bus extender that is capable of resolving SELECTION and RESELECTION conflicts in a manner that causes neither deadlock nor error conditions.

SUMMARY OF THE INVENTION

In accordance with the principles of the invention, an apparatus for resolving a SELECTION and RESELECTION conflict between initiator and target devices, which devices respectively are connected to primary and secondary busses that are connected by a bridge, comprises a mechanism for controlling the bridge to arbitrate for control of the primary bus after the conflict is detected, and a mechanism for causing the bridge to release control of the secondary bus if the mechanism for controlling the bridge enables the bridge to gain control of the primary bus. After the bridge gains control of the primary bus and releases control of the secondary bus, the target can rearbitrate for control of the secondary bus. Once the target controls the secondary bus, it can direct a RESELECTION signal to the bridge, which responsively directs such signal to the initiator. Upon receipt of the RESELECTION signal, the initiator continues transmission of the previously interrupted transmission to the target.

In accordance with another aspect of the invention, the apparatus further includes a mechanism for transmitting the SELECTION signal from the initiator to the target if the mechanism for controlling the bridge does not enable the bridge to gain control of the primary bus. After the SELECTION is delivered to the target, the bridge again may arbitrate for control of the primary bus.

BRIEF DESCRIPTION OF THE DRAWINGS

For a fuller understanding of the nature and objects of the invention, reference should be made to the following detailed description, taken in conjunction with the accompanying drawings, in which:

FIG. 3 is a block diagram of a preferred embodiment of the bridge;

DESCRIPTION OF AN ILLUSTRATIVE EMBODIMENT

Figure 1:
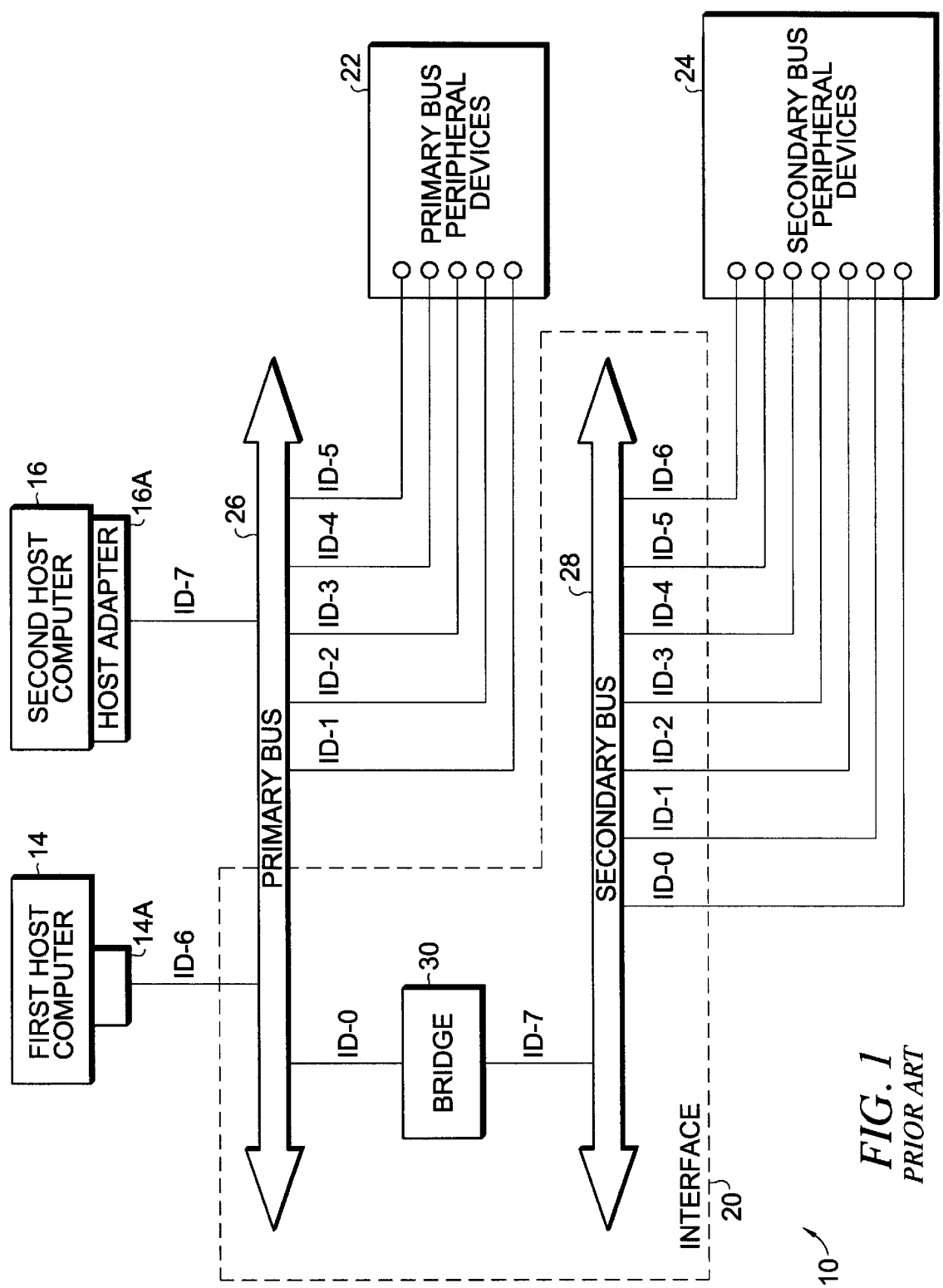
FIG. 1 is a block diagram of a computer system having a SCSI interface including main and secondary buses and a bus extender.

FIG. 1 shows a computer system 10 that may be used with an illustrative embodiment of the invention for arbitrating SELECTION and RESELECTION conflicts. The computer system 10 includes first and second host computers 14 and 16 interconnected by a SCSI interface 20. The SCSI interface 20 includes a primary SCSI bus 26 connected to the host computer 14, the secondary computer 16 and a first set of SCSI-conforming peripheral devices 22. The SCSI interface 20 further includes a secondary SCSI bus 28 connected to a second set of seven SCSI-conforming peripheral devices 24. The SCSI interface also includes a bus extender 30 (hereinafter "bridge 30") for interconnecting the primary and secondary buses 26, 28. Each host computer 14, 16 is connected to the primary bus 26 via a conventional SCSI port 14A, or, if necessary, a conventional host adapter 16A incorporating such a port. Among other functions, the interface 20 is responsible for transferring digital signals between the host computers 14,16 and the secondary-bus peripheral devices 24.

Both computers 14, 16 and each primary-bus peripheral device 22 have a unique address on the primary bus 26. Such addresses are specified in the drawings as ID_0 through ID_7. Analogously, each of the secondary-bus peripheral devices 24 has a unique address on the secondary bus 28. Such addresses also are specified in the drawings as ID_0 through ID_6.

The bridge 30 also occupies a unique address on each of the primary and secondary buses 26, 28. For example, in the illustrative embodiment, bridge 30 has a primary bus address of ID_0. The bridge has a secondary bus address of ID_7. The specific assignment of primary bus IDs can be varied by those skilled in the art, although priority during signal contention on the buses as discussed below should be taken into consideration during ID assignment.

The particular configuration of the computer system 10 of FIG. 1 is for illustrative purposes only. Any combination of computers and primary-bus peripheral devices can be used in conjunction with the invention as long as at least one computer is connected to the primary bus 26. For instance, a single computer and seven peripheral devices could be connected to the primary bus. Unlike the primary bus 26, however, the secondary bus 28 supports peripheral devices only.

The peripheral devices 22 and 24 can be any commercially available units following the SCSI standards. As long as they conform to the SCSI standards, the peripheral devices need not be specifically adapted or modified in terms of either hardware or software for use in conjunction with the invention,.

Data signals may be transmitted from the computers 14 and 16 (initiators) to the peripheral devices 24 on the secondary bus 28 (targets) by means of a SELECTION signal. Alternatively, targets may re-select an initiator to continue a previously interrupted transmission from such initiator by means of a RESELECTION signal.

The process by which the extender forms connections from the main bus initiator to a secondary bus target is fully described in the previously referenced co-pending patent application and summarized here. The principal steps in creating a new connection are as follows:

1. The initiator obtains exclusive access to the main bus through ARBITRATION as described in the SCSI standard.
2. The main bus initiator performs a SELECTION referencing the extender as the target and transfers the logical unit number to it as specified in the SCSI standard.
3. The extender obtains exclusive access to the secondary bus through ARBITRATION.
4. The extender converts the logical unit number to the address of a target on the secondary bus and performs a secondary bus SELECTION.

5. The extender joins the main and secondary bus connections to complete the path from the main bus initiator to the secondary bus target.

A target performs a reconnection when it needs to continue an I/O operation by sending or receiving data from the initiator. The process of re-forming a connection is called RESELECTION and is performed as follows:

1. The target obtains exclusive access to the secondary bus through ARBITRATION.
2. The target performs a RESELECTION referencing the extender as described in the co-pending patent.
3. The bus extender obtains exclusive access to the main bus through ARBITRATION.
4. The bus extender performs a RESELECTION of the main bus initiator as described in the co-pending patent.

Once the connections on the main and secondary busses have been established, the extender joins these together to complete the physical path needed for the transfer of data.

In accordance with the principles of the invention, the following improvement in the bus extender is described which resolves a SELECTION-RESELECTION conflict between the main bus initiator and secondary bus target.

The improved extender contains logic circuitry for the attachment of the extender to the main and secondary busses. The bus ID of the main attachment can be set to any allowable value by someone skilled in the art through a number of methods, such as jumpers or switches. The bus ID of the secondary but attachment must be permanently set to the highest arbitration priority specified by the SCSI standards (bus ID 7).

The bus extender takes advantage of the fact that any arbitration attempt on the secondary bus can only be a prelude to RESELECTION. When such an attempt is detected, the extender immediately contends for the secondary bus by arbitrating at the highest priority. The target on the secondary bus will discover that it has lost arbitration and will re-arbitrate for the bus at its next opportunity.

In the meantime, the extender retains control of the secondary bus and attempts to arbitrate for control of the primary bus. If it succeeds, it relinquishes control of the secondary bus and retains control of the main bus. Upon detecting that the secondary bus is free, the secondary bus target re-arbitrates and performs a RESELECTION as described in the pending co-patent. Since the extender already controls the main bus it can then complete the connection by forwarding the reselection to the appropriate main bus initiator. During re-arbitration on the secondary bus, another target may win. In that case, the extender simply forwards its RESELECT as described above.

If the extender looses main bus arbitration, it retains of the secondary bus. If selected by a main bus initiator, it forwards the selection to the secondary bus target as described in the previously referenced co-pending patent application. Otherwise, the extender waits for another opportunity to arbitrate for the main bus.

Figure 2A:
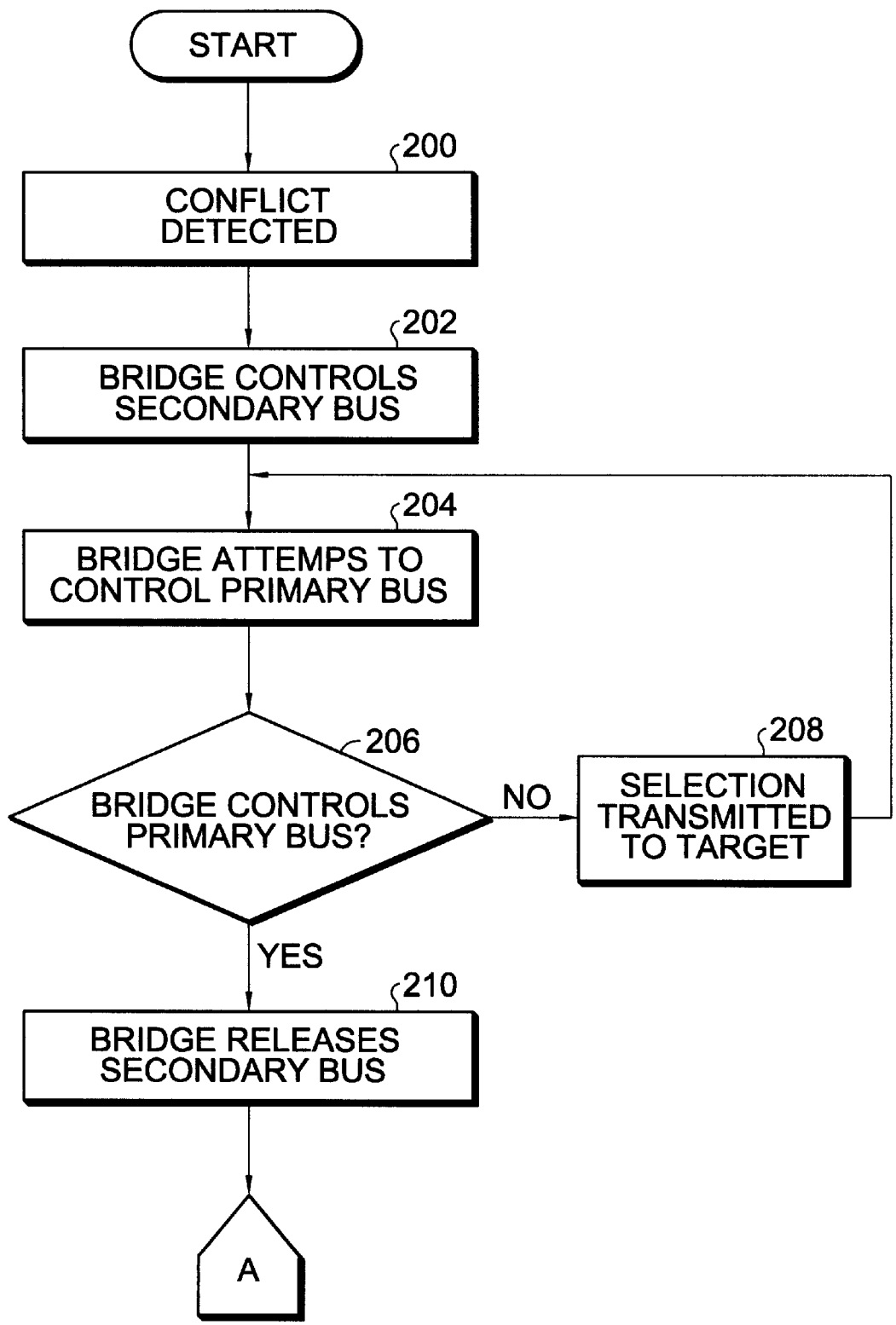
FIGS. 2A and 2B detail an arbitration process used when a SELECTION and RESELECTION conflict is detected by the bridge.
Figure 2B:
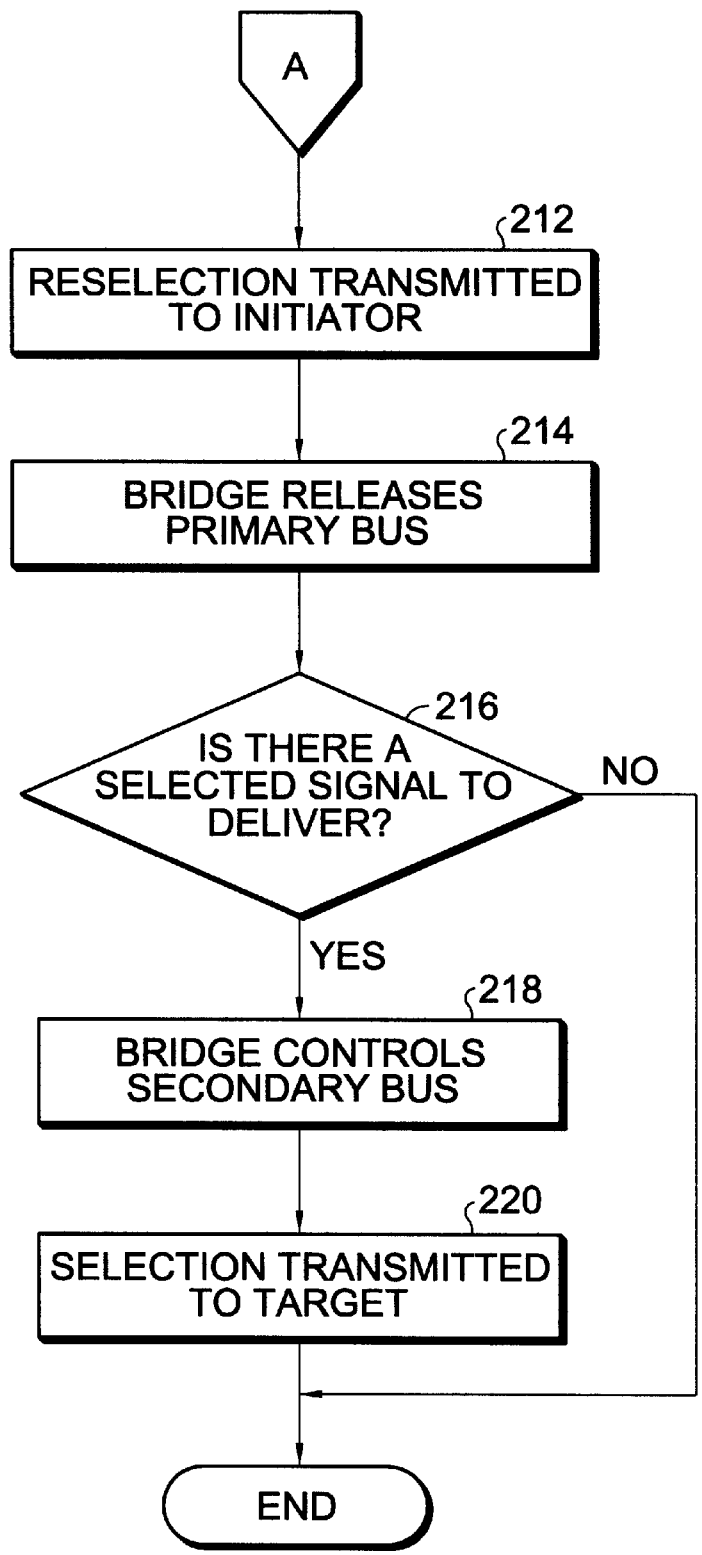

FIGS. 2A and 2B illustrate a process for resolving a SELECTION and RESELECTION conflict. The process begins at step 200 in which a SELECTION and RESELECTION conflict is detected by the bridge 30. Once detected, the bridge 30 arbitrates for control of the secondary bus 28 (step 202) so that the target requesting a RESELECTION will relinquish control of the bus and "hold" the RESELECTION request. In the preferred embodiment, the bridge 30 has the highest address ID on the secondary bus 28, which gives the bridge 30 priority for control of the bus 28 over the other peripheral devices 24 connected to the bus 28.

Once the bridge 30 controls the secondary bus 28, it arbitrates for control of the primary bus 26 (step 204). In the system 10 shown in FIG. 1, the bridge 30 has the lowest ID on the primary bus 26 and therefore will gain control of the main bus 26 when it is the only device arbitrating for control of the primary bus 26. The bridge 30 may have a higher ID, however, and thus does not require the lowest ID. At step 206, it then is ascertained if the bridge 30 has gained control of the primary bus 26. If the bridge 30 does not control the primary bus 26, the process proceeds to step 208 where the SELECTION signal is transmitted to the target. The SELECTION signal may be transmitted to the target because the bridge 30 controls the secondary bus 28 having the target. From step 208, the process loops back to step 204, in which the bridge again attempts to gain control the primary bus 26.

Alternatively, if it is determined at step 206 that the bridge 30 has gained control of the primary bus 26, then the process proceeds to step 210 where the bridge 30 releases control of the secondary bus 28. This enables the target again to rearbitrate for control of the secondary bus 28 for a RESELECTION.

Once the target has gained control of the secondary bus 28, the process continues with off page connector "A" to step 212 of FIG. 2B. At step 212, the RESELECTION signal is transmitted to the initiator via the bridge 30 (step 212). After the RESELECTION signal is transmitted, the bridge 30 releases control of the primary bus (step 214).

It then is ascertained at step 216 if there is a SELECTION signal to be delivered to a target. If the SELECTION signal has already been delivered to the target, the process ends. If there is a SELECTION signal to be delivered, the bridge 30 then arbitrates for control of the secondary bus 28 (step 218). The SELECTION signal then is transmitted to the target via the bridge 30 at step 220.

FIG. 3 shows a block diagram of a preferred embodiment of the bridge 30, as including primary-bus and secondary-bus transceivers 42, 44, transfer circuits 46, 48 for selectively passing signals between the primary-bus transceiver 42 and the secondary-bus transceiver 44, and control logic 50 for controlling the operation of the other components of the bridge 30. The bridge 30 also has a primary-bus ID-input arrangement 52, such as a group of switches, which permits a user to manually enter, and then store, a primary-bus ID identifying the bridge 30. In addition, the bridge 30 has a clock 30A for providing timing signals, and a power supply 30B.

Each transceiver 42, 44 has a receiver 56 for receiving signals from the respective originating buses 26, 28, and a driver 58 for sending or asserting signals on the respective target buses 28, 26. The transceivers 42, 44 can be either both differential or both single-ended transceivers, or one can be differential and the other single-ended, and, in any event, should conform with the type of signal lines on the bus 26, 28 to which each transceiver 42, 44 is connected.

Each transfer circuit 46, 48 modifies certain signals, i.e., connection-control signals, received by the transceivers 44, 48, and passes other signals, i.e., message data signals, without modification. Each transfer circuit 46, 48 has a demultiplexer 62 ("DEMUX") for receiving the received signals at a data input thereof from the respective transceiver 42, 44 and, in response to a control signal at a control input thereof, for passing the message data signals onto direct data lines 64 connected to a first output of the DEMUX 62 and passing the connection-control signals 65A, 65B to a converter 66 connected to a second output of the DEMUX 62. The direct data lines 64 of the transfer circuit 46, 48 directly couple the message data signal passed by the DEMUX 62 to a multiplexer 68 ("MUX") at a first data input thereof.

The converter 66 translates the ID and LUN field data of the connection-control signals 65A, 65B into appropriate ID and LUN field data for use on the destination bus 28, 26, in conformance with the address specifications of the SCSI standards. The converter 66 then passes the generated ID and LUN field data to the connection-control signal generator 72, which conforms connection-control signals 65C, 65D suitable for use on the bus 28, 26 that is to receive the communication. The operation of the converters 66 and signal generators 72 of the transfer circuits 46, 48 is described in more detail below.

The connection-control signals 65C, 65D generated by the signal generator 72 of the transfer circuit 46, 48 are applied to the MUX 68 at a second data input thereof. Responsive to a control signal 74B, 76B at a control input thereof, the MUX 68 passes either the message data signals received over the direct data lines 64, the connection control signals 65C, 65D, or signals 74C, 76C generated by the control logic 50 (as described hereinafter), to the driver 58 of the target bus 28, 26.

The control logic 50 includes first and second control logic modules 74, 76 which, among other functions, (i) monitor (over detect lines 78) signals received by the transceivers 42, 44, and, in response thereto, (ii) control the direction of the transceivers 42, 44 i.e., controls whether the transceivers are driving or receiving signals using transceiver control lines 82, (iii) control the operation of the DEMUXs 62 and the MUXs 68 by applying thereto appropriate control signals 74A, 74B, and 76A, 76B, and (iv) assert signals 74C, 76C to third data inputs of MUXs 68 to be sent over the target buses.

The control logic 50 generates signal and control bridge 30 in accordance with FIGS. 2A, 2b, and 3, and may be implemented economically through the use of application-specific integrated circuitry (ASIC), a programmable logic 50 can also constitute a programmable logic array, or a microprocessor, with discrete logic devices. The transfer circuits 46 and 48 also may be implemented using ASIC.

The bridge 30 has an architecture substantially similar to that described in the previously referenced copending U.S. patent application Ser. No. 08/965,073, entitled SCSI Bus Extender Utilizing Tagged Queuing in a Multi-Initiator Environment.

The signal sequence diagrams for the SELECTION and RESELECTION operations used by bus extender 30 are described in U.S. Pat. No. 5,274,783 with regard to FIGS. 7 and 8 thereof and the accompanying description in the specification.

A software implementation of the above described embodiment(s) may comprise a series of computer instructions either fixed on a tangible medium, such as a computer readable media, e.g. diskette, CD-ROM, ROM, RAM, ASIC, Programmable Logic Array, programmable registers or fixed disk, or transmittable to a computer system, via a modem or other interface device. The medium can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results.

What is claimed is:

1. In a bus extender apparatus operatively coupling a primary SCSI bus to a secondary SCSI bus, the primary bus having at least one initiator device operatively coupled thereto, the secondary bus having at least one target device operatively coupled thereto, a method of resolving overlapping SELECTION and RESELECTION operations on the primary bus and secondary bus, respectively, the method comprising the steps of:

A. detecting a SELECTION signal on the primary bus substantially simultaneously with a RESELECTION signal on the secondary bus;
   B. arbitrating for control of the secondary bus when substantially simultaneous SELECTION and RESELECTION signals are detected;
   C. arbitrating for control of the primary bus after control of the secondary bus is obtained;
   D. asserting a SELECTION signal from an initiator device on the primary bus to a target device on the secondary bus, if control of the primary bus is not obtained;
   E. releasing control of the secondary bus once control of the primary bus is obtained; and
   F. re-arbitrating for control of the primary bus after control of the secondary bus has been obtained.

2. The method as defined by claim 1 further including the step of:

G. asserting a RESELECTION signal from a target device to an initiator device if control of the primary bus is obtained.

3. The method as defined by claim 1 wherein step C comprises the step of:

C1. detecting a request from the at least one initiator device to control the primary bus.

4. The method as defined by claim 1 wherein the bus extender apparatus has an identifier on the secondary bus and each of the target devices have an identifier on the secondary bus, the identifier determining priority of control on the secondary bus, the bus extender having an identifier number that has highest priority of control on the secondary bus.

5. A bus extender apparatus operatively coupling a primary SCSI bus to a secondary SCSI bus, the primary bus having at least one initiator device operatively coupled thereto, the secondary bus having at least one target device operatively coupled thereto, the apparatus capable of resolving a conflict between substantially simultaneous SELECTION and RESELECTION operations on the primary bus and secondary bus, respectively, the apparatus comprising:

A. means for detecting a SELECTION signal on the primary bus substantially simultaneously with a RESELECTION signal on the secondary bus;

B. means for arbitrating for control of the secondary bus when substantially simultaneous SELECTION and RESELECTION signals are detected;

C. means for arbitrating for control of the primary bus after control of the secondary bus is obtained;

D. means for asserting a SELECTION signal from an initiator device on the primary bus to a target device on the secondary bus if control of the primary bus is not obtained;

E. means for releasing control of the secondary bus once control of the primary bus is obtained; and F. means for re-arbitrating for control of the primary bus after control of the secondary bus has been obtained.

6. The apparatus as defined by claim 5 further including:

G. means for asserting a RESELECTION signal from a target device to an initiator device if control of the primary bus is obtained.

7. The apparatus as defined by claim 5 wherein the controlling means includes:

C.1 means for detecting a request from the at least one initiator device to control the primary bus.

8. The apparatus as defined by claim 1 wherein the bus extender apparatus has an identifier on the secondary bus and each of the target devices have an identifier on the secondary bus, the identifier determining priority of control on the secondary bus, the bus extender having an identifier number that has highest priority of control on the secondary bus.

9. A computer program product for use with a bus extender apparatus, the bus extender apparatus operatively coupling a primary SCSI bus to a secondary SCSI bus, the primary bus having at least one initiating device operatively coupled thereto, the secondary bus having at least one target device operatively coupled thereto, the computer program product comprising a computer usable medium having program code embodied in the medium, the program code comprising:

A. program code for detecting a SELECTION signal on the primary bus substantially simultaneously with a RESELECTION signal on the secondary bus;

B. program code for arbitrating for control of the secondary bus when substantially simultaneous SELECTION and RESELECTION signals are detected;

C. program code for arbitrating for control of the primary bus after control of the secondary bus is obtained;

D. program code for asserting a SELECTION signal on the secondary bus from an initiator device on the primary bus if control of the primary bus is not obtained;

E. program code for releasing control of the secondary bus once control of the primary bus is obtained; and F. program code for re-arbitrating for control of the primary bus after the SELECTION signal has been asserted on the secondary bus.

10. The computer program product as defined by claim 9 further including:

G. Program code for asserting a RESELECTION signal from a target device to an initiator device if control of the primary bus is obtained.

11. The computer program product as defined by claim 1 wherein the program code for controlling comprises:

C.1 program code for detecting a request from the at least one initiator device to control the primary bus.

12. The computer program product as defined by claim 9 wherein the bus extender apparatus has an identifier on the secondary bus and each of the target devices have an identifier on the secondary bus, the identifier determining priority of control on the secondary bus, the bus extender having an identifier number that has highest priority of control on the secondary bus.

* * * * *